(12) United States Patent
Bhogal et al.

(10) Patent No.: US 11,680,712 B2
(45) Date of Patent: Jun. 20, 2023

(54) METHOD AND SYSTEM FOR SENSOR MAINTENANCE

(71) Applicant: June Life, Inc., San Francisco, CA (US)

(72) Inventors: Nikhil Bhogal, San Francisco, CA (US); Nishit Kumar, San Francisco, CA (US); Robert Cottrell, San Francisco, CA (US); Jithendra Paruchuri, San Francisco, CA (US); Ryan Perry, San Francisco, CA (US); Matthew Van Horn, San Francisco, CA (US); Christopher Russell Clark, San Francisco, CA (US); Eugenia Kuo, San Francisco, CA (US)

(73) Assignee: June Life, Inc., San Francisco, CA (US)

( * ) Notice: Subject to any disclaimer, the term of this patent is extended or adjusted under 35 U.S.C. 154(b) by 198 days.

(21) Appl. No.: 17/201,953

(22) Filed: Mar. 15, 2021

(65) Prior Publication Data

US 2021/0285653 A1    Sep. 16, 2021

Related U.S. Application Data

(60) Provisional application No. 62/989,318, filed on Mar. 13, 2020, provisional application No. 63/026,625, filed on May 18, 2020.

(51) Int. Cl.
*F24C 7/08* (2006.01)
*G06V 10/764* (2022.01)
(Continued)

(52) U.S. Cl.
CPC ............ *F24C 7/085* (2013.01); *G06V 10/764* (2022.01); *G06V 10/82* (2022.01); *G06V 10/993* (2022.01); *G06V 20/68* (2022.01)

(58) Field of Classification Search
CPC ...... G06K 9/628; G06K 9/6256; G06V 10/82; G06V 10/993; G06V 20/68
See application file for complete search history.

(56) References Cited

U.S. PATENT DOCUMENTS

| 3,453,997 | A | 7/1969 | Klepzig |
| 3,911,893 | A | 10/1975 | Baker et al. |

(Continued)

FOREIGN PATENT DOCUMENTS

| CN | 1900858 A | 1/2007 |
| CN | 101504158 A | 8/2009 |

(Continued)

OTHER PUBLICATIONS

U.S. Appl. No. 12/216,999, filed Jul. 14, 2008, Kim et al.
(Continued)

*Primary Examiner* — Thien S Tran
(74) *Attorney, Agent, or Firm* — Jeffrey Schox; Diana Lin

(57) ABSTRACT

The method for dirty camera detection including: detecting a first predetermined state change event; sampling a set of cavity measurements; optionally determining a set of features of the set of cavity measurements; determining a class label based on the cavity measurements; optionally verifying the classification; and facilitating use of the appliance based on the classification.

7 Claims, 13 Drawing Sheets

(51) Int. Cl.
  *G06V 10/82* (2022.01)
  *G06V 10/98* (2022.01)
  *G06V 20/68* (2022.01)

(56) References Cited

U.S. PATENT DOCUMENTS

| | | | |
|---|---|---|---|
| 4,415,790 A | 11/1983 | Diesch et al. |
| 5,360,965 A | 11/1994 | Ishii et al. |
| 5,412,448 A | 5/1995 | Kunishige |
| 5,546,475 A | 8/1996 | Bolle et al. |
| 6,310,964 B1 | 10/2001 | Mohan et al. |
| 6,359,270 B1 | 3/2002 | Bridson |
| 6,384,384 B1 | 5/2002 | Connolly et al. |
| 6,759,635 B2 | 7/2004 | Lile |
| 6,821,016 B2 | 11/2004 | Sato et al. |
| 6,856,247 B1 | 2/2005 | Wallace |
| 6,862,494 B2 | 3/2005 | Hu et al. |
| 7,013,661 B2 | 3/2006 | Gatling et al. |
| 7,102,107 B1 | 9/2006 | Chapman |
| 7,150,891 B2 | 12/2006 | Greiner et al. |
| 7,445,381 B2 | 11/2008 | Rund et al. |
| 7,516,692 B2 | 4/2009 | Pirkle et al. |
| 7,566,168 B2 | 7/2009 | Rund et al. |
| 7,663,502 B2 | 2/2010 | Breed |
| 7,845,823 B2 | 12/2010 | Mueller et al. |
| 8,091,543 B2 | 1/2012 | Baumann et al. |
| 8,193,474 B2 | 6/2012 | Harris |
| 8,426,777 B2 | 4/2013 | Elston et al. |
| 8,555,776 B2 | 10/2013 | Debord et al. |
| 8,766,144 B2 | 7/2014 | Mcloughlin et al. |
| 8,931,400 B1 | 1/2015 | Allen |
| 9,017,751 B2 | 4/2015 | Rauh |
| 9,041,799 B2 | 5/2015 | Bielstein |
| 9,069,340 B2 | 6/2015 | Minvielle |
| 9,149,058 B2 | 10/2015 | Bilet et al. |
| 9,414,444 B2 | 8/2016 | Libman et al. |
| 9,460,633 B2 | 10/2016 | Minvielle |
| 9,528,972 B2 | 12/2016 | Minvielle |
| 9,564,064 B2 | 2/2017 | Minvielle |
| 9,644,847 B2 | 5/2017 | Bhogal et al. |
| 9,927,129 B2 | 3/2018 | Bhogal et al. |
| 9,933,166 B2 | 4/2018 | Matarazzi et al. |
| 10,024,736 B2 | 7/2018 | Nivala et al. |
| 10,057,946 B2 | 8/2018 | Mills et al. |
| 10,092,129 B2 | 10/2018 | Jenkins et al. |
| 10,559,186 B2 | 2/2020 | Allen |
| 2003/0139843 A1 | 7/2003 | Hu et al. |
| 2005/0046584 A1 | 3/2005 | Breed |
| 2005/0133019 A1 | 6/2005 | Kim et al. |
| 2006/0185523 A1 | 8/2006 | Wiedemann et al. |
| 2006/0218057 A1 | 9/2006 | Fitzpatrick et al. |
| 2006/0219234 A1 | 10/2006 | Larsen |
| 2007/0001012 A1 | 1/2007 | Kim et al. |
| 2007/0029306 A1 | 2/2007 | Chun et al. |
| 2007/0125760 A1 | 6/2007 | Kim et al. |
| 2008/0029078 A1 | 2/2008 | Baumann et al. |
| 2008/0120188 A1 | 5/2008 | Mobley et al. |
| 2009/0255920 A1 | 10/2009 | Bonassi et al. |
| 2009/0274805 A1 | 11/2009 | Schonemann |
| 2010/0006558 A1 | 1/2010 | Mcloughlin et al. |
| 2010/0021606 A1 | 1/2010 | Rauh |
| 2010/0124378 A1 | 5/2010 | Das et al. |
| 2010/0134620 A1 | 6/2010 | Bielstein |
| 2010/0138075 A1 | 6/2010 | Boer et al. |
| 2010/0145483 A1 | 6/2010 | Mcgonagle et al. |
| 2010/0147823 A1 | 6/2010 | Anderson et al. |
| 2010/0320189 A1 | 12/2010 | Buchheit |
| 2011/0002677 A1 | 1/2011 | Cochran et al. |
| 2011/0123689 A1 | 5/2011 | Luckhardt et al. |
| 2011/0284518 A1 | 11/2011 | Elston et al. |
| 2012/0017882 A1 | 1/2012 | Kitaguchi et al. |
| 2012/0038549 A1 | 2/2012 | Mandella et al. |
| 2012/0100269 A1 | 4/2012 | Polt |
| 2012/0170247 A1 | 7/2012 | Do |
| 2012/0288595 A1 | 11/2012 | Randall et al. |
| 2013/0052310 A1 | 2/2013 | Stanford |
| 2013/0084369 A1 | 4/2013 | Smrke |
| 2013/0092680 A1 | 4/2013 | Cartwright et al. |
| 2013/0092682 A1 | 4/2013 | Mills et al. |
| 2013/0171304 A1 | 7/2013 | Huntley |
| 2013/0176116 A1 | 7/2013 | Jung et al. |
| 2013/0269539 A1 | 10/2013 | Polt |
| 2013/0277353 A1 | 10/2013 | Joseph et al. |
| 2013/0306627 A1 | 11/2013 | Libman et al. |
| 2014/0026762 A1 | 1/2014 | Riefenstein |
| 2014/0199455 A1 | 7/2014 | Bilet et al. |
| 2014/0203012 A1 | 7/2014 | Corona et al. |
| 2014/0232869 A1* | 8/2014 | May ................ H04N 7/18 348/148 |
| 2014/0297467 A1 | 10/2014 | Soller et al. |
| 2014/0334691 A1* | 11/2014 | Cho .............. G06Q 30/0631 382/110 |
| 2015/0056344 A1 | 2/2015 | Luckhardt |
| 2015/0136760 A1 | 5/2015 | Lima et al. |
| 2015/0170000 A1 | 6/2015 | Yang et al. |
| 2015/0285513 A1 | 10/2015 | Matarazzi et al. |
| 2015/0289324 A1 | 10/2015 | Rober et al. |
| 2016/0242240 A1 | 8/2016 | Lee et al. |
| 2016/0278563 A1 | 9/2016 | Choudhary |
| 2016/0283822 A1 | 9/2016 | Imai et al. |
| 2017/0074522 A1 | 3/2017 | Cheng |
| 2017/0150842 A1 | 6/2017 | Young et al. |
| 2017/0208652 A1 | 7/2017 | Luckhardt et al. |
| 2017/0224161 A1 | 8/2017 | Li et al. |
| 2017/0332841 A1 | 11/2017 | Reischmann |
| 2018/0184668 A1 | 7/2018 | Stork Genannt Wersborg |
| 2018/0324908 A1* | 11/2018 | Denker ............. H05B 6/687 |
| 2019/0110638 A1 | 4/2019 | Li et al. |
| 2019/0200797 A1* | 7/2019 | Diao .................. A47J 29/00 |
| 2019/0234617 A1 | 8/2019 | Bhogal et al. |
| 2019/0250043 A1 | 8/2019 | Wu et al. |
| 2019/0354810 A1 | 11/2019 | Samel et al. |
| 2020/0069103 A1 | 3/2020 | Baldwin et al. |
| 2020/0193620 A1* | 6/2020 | Armstrong ......... G06V 10/82 |
| 2020/0217512 A1 | 7/2020 | Clayton et al. |

FOREIGN PATENT DOCUMENTS

| | | |
|---|---|---|
| CN | 201353794 Y | 12/2009 |
| CN | 202392848 U | 8/2012 |
| CN | 103234228 A | 8/2013 |
| CN | 103501618 A | 1/2014 |
| CN | 103592227 A | 2/2014 |
| CN | 104042124 A | 9/2014 |
| CN | 203914599 U | 11/2014 |
| DE | 19828333 A1 | 12/1999 |
| DE | 102005030483 A1 | 1/2007 |
| DE | 202008000135 | 3/2008 |
| DE | 102008043722 A1 | 5/2010 |
| DE | 102012204229 A1 | 9/2013 |
| EP | 0298858 A1 | 1/1989 |
| EP | 0899512 A1 | 3/1999 |
| EP | 1179711 A1 | 2/2002 |
| EP | 1746350 A2 | 1/2007 |
| EP | 2149755 A1 | 2/2010 |
| EP | 2515044 A1 | 10/2012 |
| EP | 2618634 A1 | 7/2013 |
| GB | 1163509 A | 9/1969 |
| GB | 1195750 A | 6/1970 |
| JP | 11-63509 | 3/1999 |
| JP | 2005276171 A | 10/2005 |
| JP | 201353794 | 3/2013 |
| WO | 2006128696 A1 | 12/2006 |
| WO | 2007022507 A2 | 2/2007 |
| WO | 2009002874 A2 | 1/2009 |
| WO | 2013167333 A1 | 11/2013 |
| WO | 2014086486 A2 | 6/2014 |
| WO | 2014086487 A1 | 6/2014 |
| WO | 2015059931 A1 | 4/2015 |
| WO | 2019232113 A1 | 12/2019 |

(56) References Cited

OTHER PUBLICATIONS

U.S. Appl. No. 13/059,486, filed Aug. 26, 2009, Sakane, et al.
U.S. Appl. No. 13/978,413, filed Apr. 19, 2012, Ruther.
U.S. Appl. No. 14/205,587, filed Mar. 12, 2014, Chadwick, et al.
U.S. Appl. No. 14/205,593, filed Mar. 12, 2014, Chadwick, et al.
U.S. Appl. No. 15/510,544, filed Oct. 9, 2015, Kondo, et al.
"Automated Fruit Recognition for Super Markets and Food Stores, Fraunhofer, http://www.iosb.fraunhofer.de/servlet/s/33328/, accessed online Nov. 13, 2014."
"Electrolux launches CombiSteam Pro Smart", http://www.homeappliancesworld.com/2018/03/08/electrolux-launches-combisteam-pro-smart/, downloaded from internet on Jan. 18, 2019, 2 pages.
Fang, Chi et al. "Cooking Time Optimization on Given Machine Constraints and Order Constraints" Integer Programming Approach, Dec. 17, 2016.
Sun, Da-Wen; "Computer Vision Technology For Food Quality Evaluation", Second Edition, Academic Press, 2016.
Karimi, Davood "Deep learning with noisy labels: exploring techniques and remedies in medical image analysis" arXiv: 1912.02911v4 [cs.CV] Mar. 20, 2020.
International Search Report and Written Opinion for Application No. PCT/2021/022352 dated Jul. 1, 2021.
Khan, Tareq, "An Intelligent Microwave Oven with Thermal Imaging and Temperature Recommendation Using Deep Learning", Applied System Innovation, 2020, 3, 13, Feb. 17, 2020, www.mdpi.com/journal/asi.
International Search Report and Written Opinion for Application No. PCT/2021/024648 dated Jun. 23, 2021.
Chen, Pengfei, et al., "Understanding and Utilizing Deep Neural Networks Trained with Noisy Labels", Proceeding of the 36th International Conference on Machine Learning, Long Beach, California, PMLR 97, 2019.
Reitermanova, Z., et al., "Data Splitting", WDS '10 Proceedings of Contributed Papers, Part I, 31-36, 2010.
Xu, Yan, et al., "Multiple Clustered Instance Learning for Histopathology Cancer Image Classification, Segmentation and Clustering", 2012, IEEE (Year: 2012).

\* cited by examiner

METHOD AND SYSTEM FOR SENSOR MAINTENANCE

CROSS-REFERENCE TO RELATED APPLICATIONS

This application claims the benefit of U.S. Provisional Application Ser. No. 62/989,318 filed 13 Mar. 2020 and U.S. Provisional Application Ser. No. 63/026,625, filed on 18 May 2020, each which is incorporated in its entirety by this reference.

TECHNICAL FIELD

This invention relates generally to the field of appliances, and more specifically to a new and useful system and method for sensor monitoring and maintenance.

BACKGROUND

Automated appliances, such as smart ovens, can rely on computer-vision-based techniques to automatically recognize foodstuff to be cooked. However, when the cameras sampling the source images are in-situ (e.g., located within the cooking cavity), the cameras can become soiled or obscured, which can reduce the foodstuff recognition efficacy and accuracy.

Additionally, computer-vision-based techniques can cause additional challenges related to labelling and classification. Although a camera lens can be clean, an accessory located in the cavity of the appliance can be dirty and/or the appliance surfaces can be dirty, which can cause labelling discrepancies for images captured by a clean camera lens depicting foodstuff in a dirty oven and/or on a dirty accessory. The inventors discovered that labelling is more reliable when the appliance is empty (e.g., no foodstuff present) because it is easier to determine if the lens itself is dirty or if the lens is clean and the appliance and/or the accessory is dirty.

Thus, there is a need in the field of appliance control to create a new and useful system and method for dirty camera detection. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
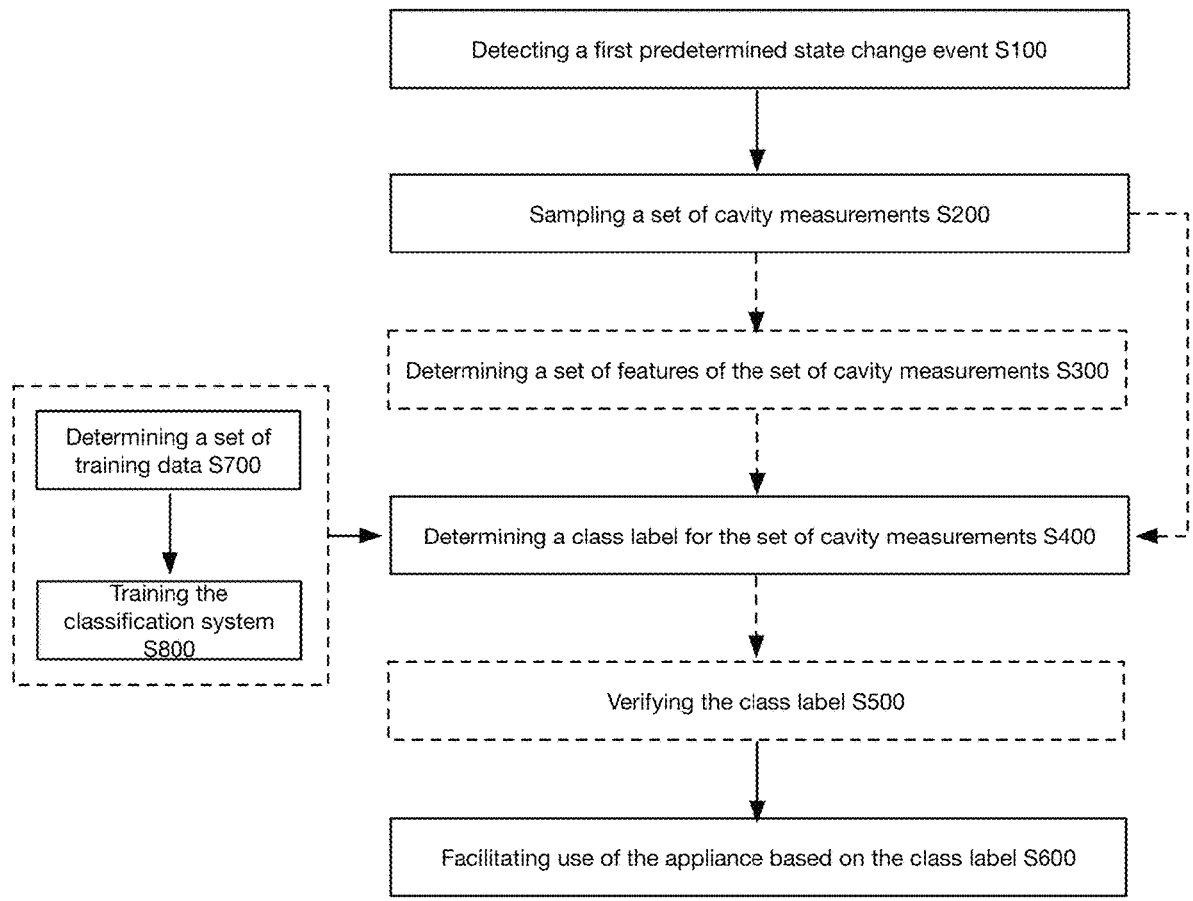
FIG. 1 is a schematic representation of the method.
Figure 3:
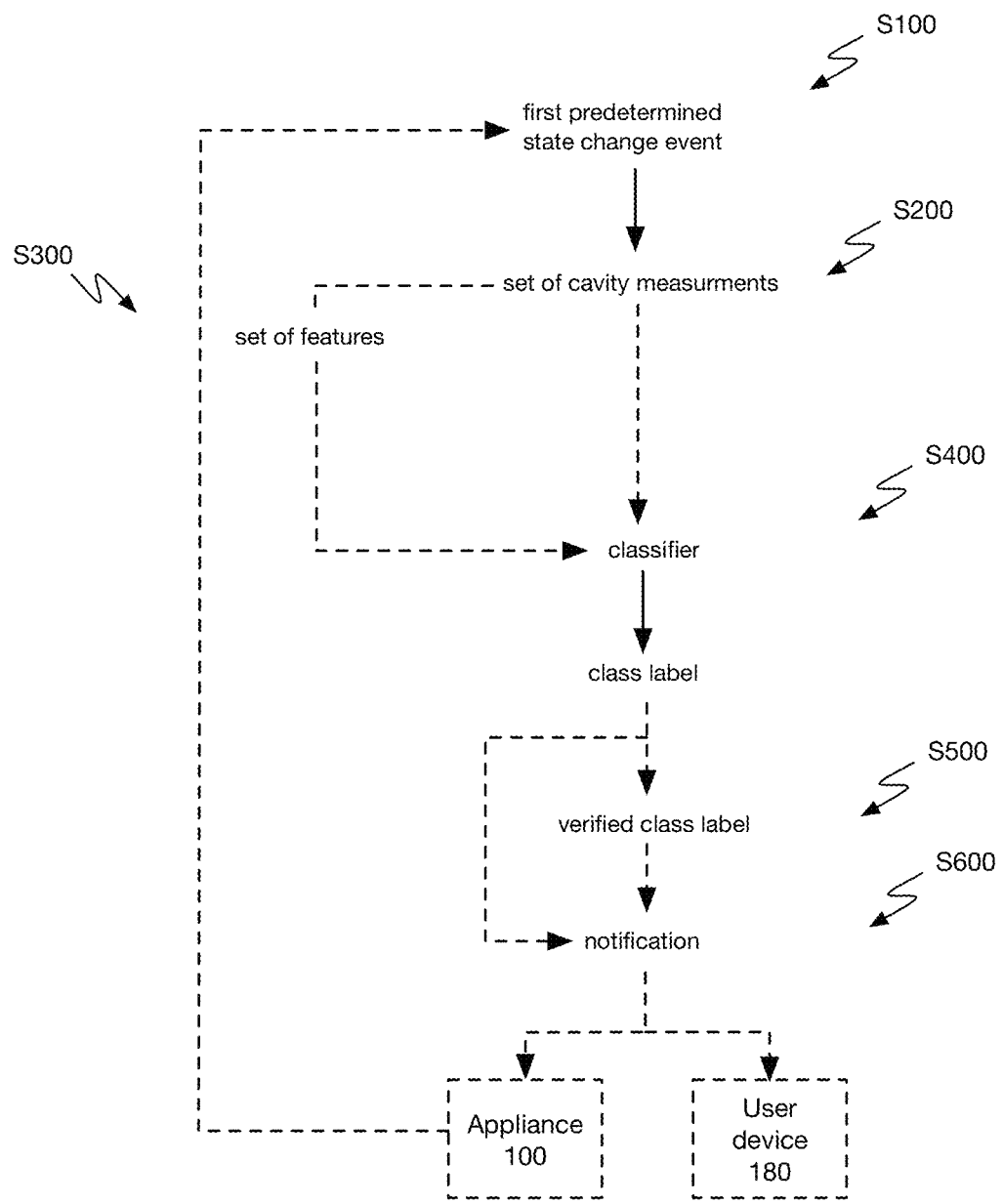
FIG. 3 is a schematic representation of an embodiment of the system and method.

As shown in FIG. 1, a method for dirty camera detection (e.g., dirty lens detection) includes: detecting a first predetermined state change event S100, sampling a set of cavity measurements S200, optionally determining a set of features of the set of cavity measurements S300, determining a class label based on the set of cavity measurements S400, optionally verifying the class label S500, and facilitating use of the appliance based on the class label S600. However, the method can additionally or alternatively include determining a set of training data S700, training the classification system S800, and/or any other suitable elements. An embodiment of the method is depicted in FIG. 3.

2. Examples

Figure 4A:
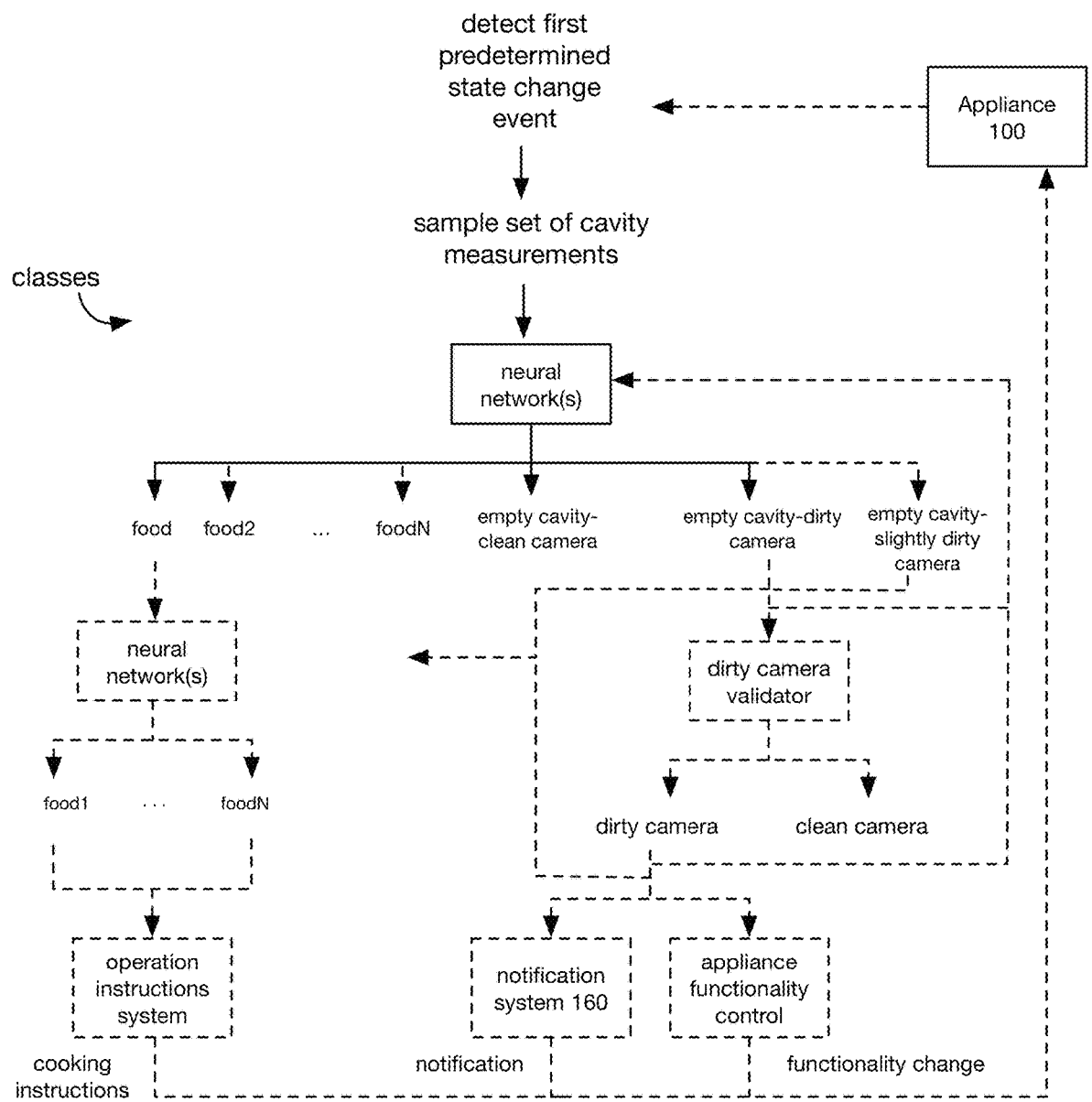
FIGS. 4A-B are schematic representations of examples of the system and method.
Figure 4B:
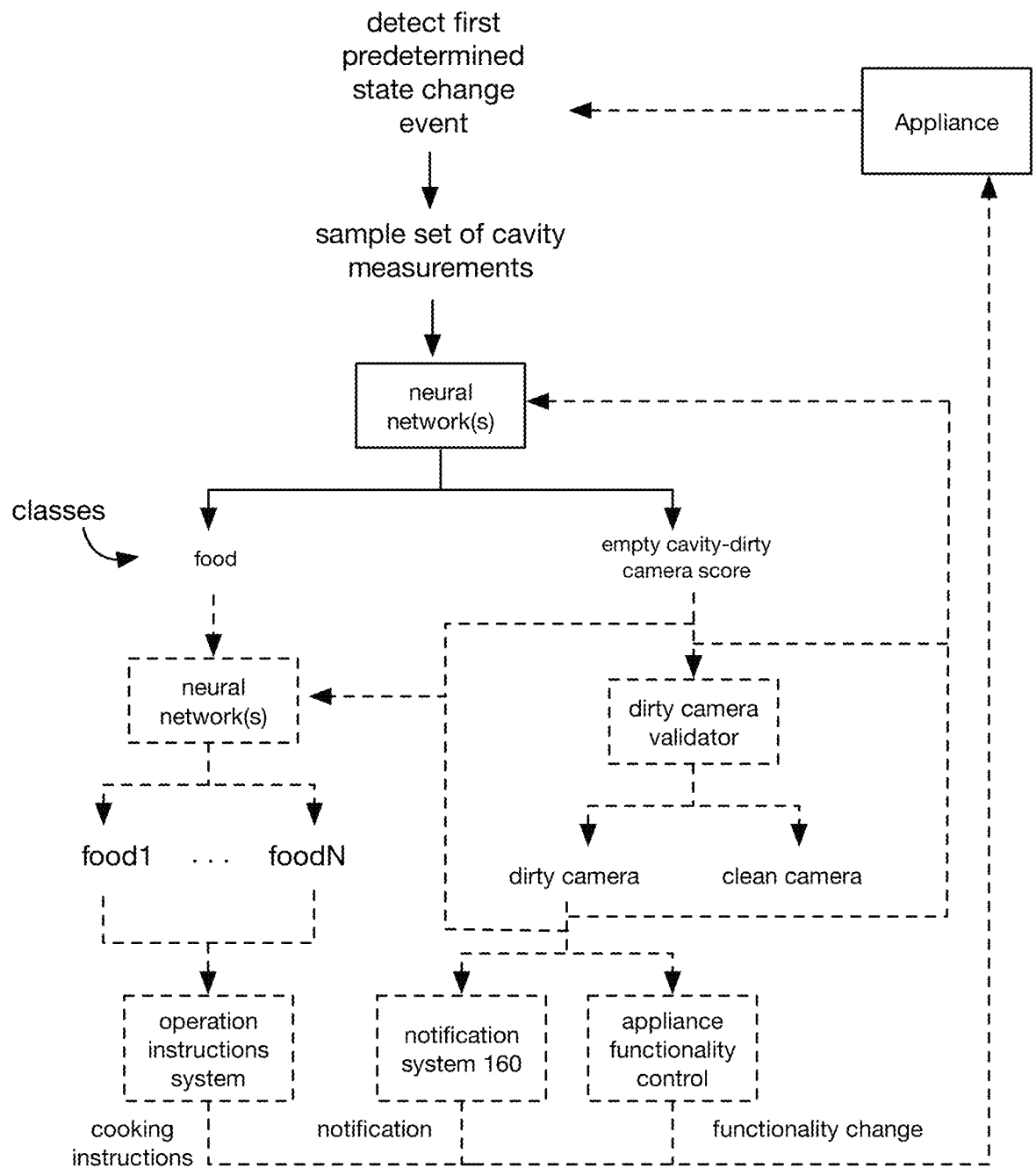
Figure 8:
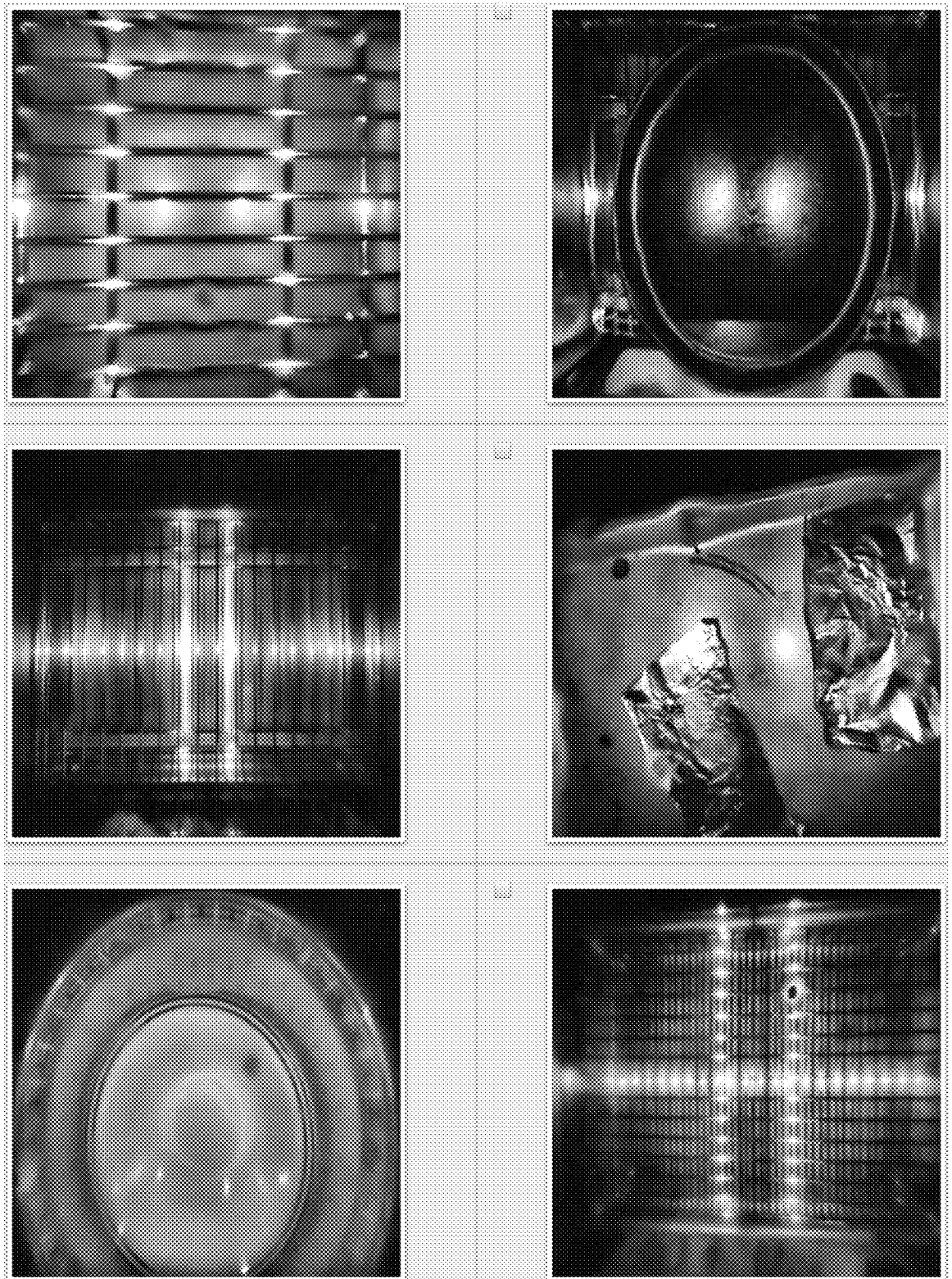
FIGS. 8 and 9 are specific examples of images sampled by clean cameras and dirty cameras, respectively.
Figure 9:
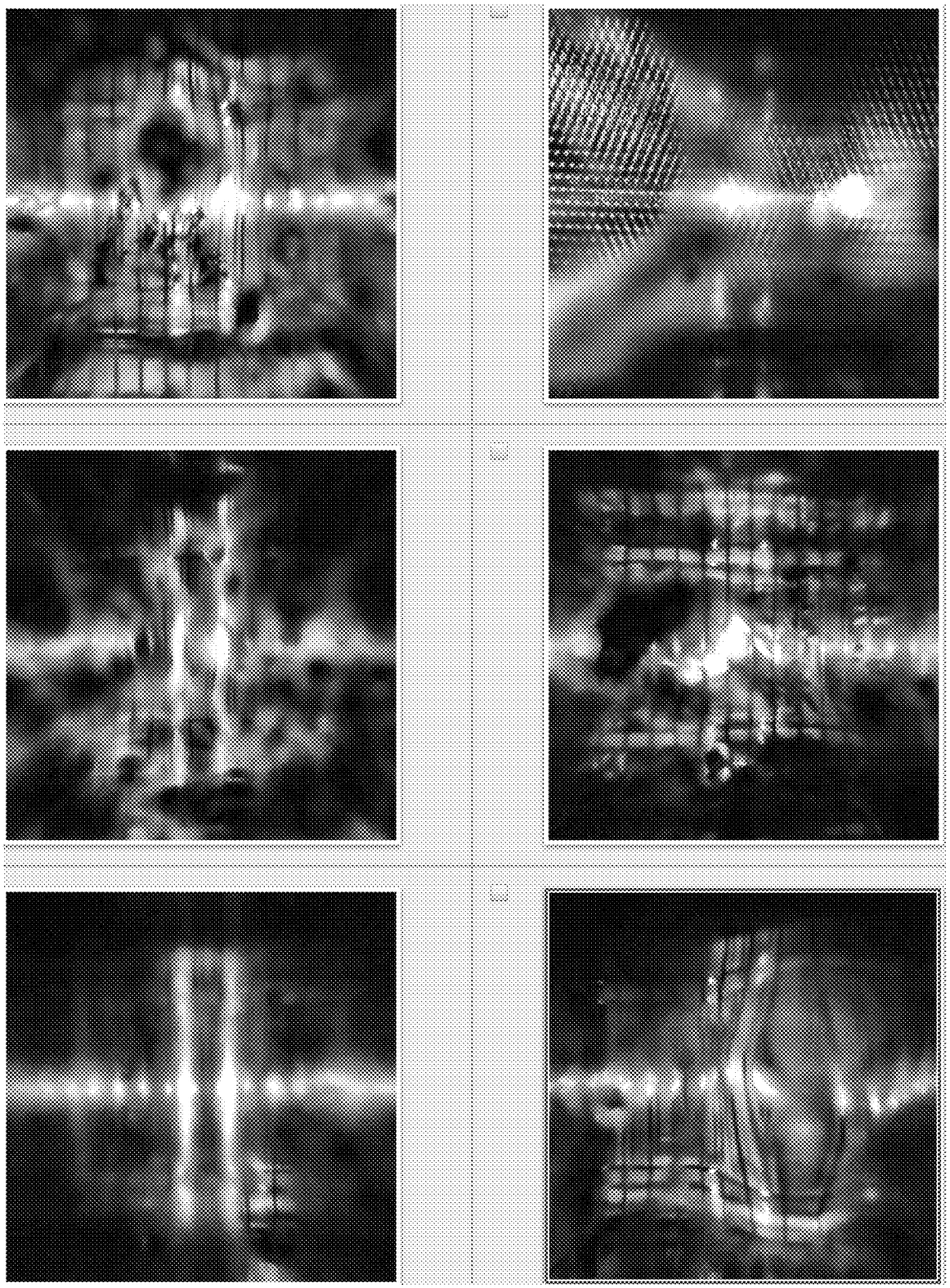

In a specific example, such as depicted in FIGS. 4A-B, the method can include: at an appliance, detecting a door opening event; capturing a series of images of the appliance's cavity, using an appliance camera; determining a class label for the appliance cavity based on the series of images, wherein the class label can be one of: empty-clean, empty-dirty, full-clean, or full-dirty (e.g., wherein the class can represent multi-component state combinations for the cavity and camera, respectively); and facilitating appliance use by the user based on the class. Additionally or alternatively, the class label can include dirtiness levels (e.g., clean, slightly dirty, dirty, etc.) and/or a dirty camera score. Specific examples of images sampled by clean cameras and dirty cameras, respectively, are depicted in FIGS. 8-9. In a first example, facilitating appliance use can include, in response to the class including a "dirty" subclass (e.g., "full-dirty," "empty-dirty", "slightly dirty", etc.): sending the user a notification, selectively deactivating appliance functionalities (e.g., functionalities that are image-dependent, such as automatic food recognition, estimated time to completion, etc.), automatically initiating cleaning processes (e.g., automatically ordering cleaning supplies, automatically initiating a cleaning cycle), and logging the "dirty" subclass and/or underlying sensor data for subsequent camera state validation. In a second example, facilitating appliance use can include, in response to the class including a "clean" subclass (e.g., "full-clean", "empty-clean", etc.): automatically cooking food placed in the cook cavity during a subsequent cook session (e.g., user using the appliance, following a cook program, etc.).

Additionally or alternatively, when the class label is a dirty camera score, facilitating appliance use can be based on the dirty camera score falling above or below a predetermined dirtiness threshold and/or range. Additionally, different notifications can be associated with different scores. For example, when the score is within a range associated with a slightly-dirty camera label, the notification can include a warning, a number of days until cleaning, and/or any other suitable information. The number of days until cleaning can be determined based on rules, heuristics, algorithms (e.g., regressions, neural networks, decision trees, clustering algorithms, etc.), and/or otherwise determined.

3. Benefits

The method confers several benefits over conventional systems.

First, human labelling is challenging when food is present in the appliance so, at inference, images depicting both full and empty appliances are captured and used to determine the state of the camera. However, since labelling clean vs. dirty cameras is easier for images that do not depict foodstuff, at inference, the inventors discovered that using classifications of clean vs. dirty camera for empty appliances (e.g., empty appliance cavities) yields higher accuracy than using classifications for both full and empty appliances. It can also be practical to use images of empty appliances because, in variants, the cavity is imaged upon each state change event occurrence (e.g., door open and close), regardless of whether food is within the cavity; this system and method simply uses these images that would have otherwise been discarded. Further, the inventors discovered that using a classification system that recognizes a single class representative of multiple components' states is computationally less intensive than individually determining the component states.

Second, the method and system enable increased accuracy by storing a memory of classifications and notifying the user to clean the appliance after at least M dirty classifications out of N classifications (e.g., wherein M is less than N). For example, the system can notify the user to clean the appliance after at least M consecutive dirty classifications including the most recent classification, after at least M nonconsecutive dirty classifications (e.g., including or irrespective of the current dirty classification) out of the last N classifications, and/or otherwise notifying the user.

Third, in order to satisfy hardware constraints of the appliance, the inventors extended an existing food classification system to include dirty and clean camera class labels (e.g., wherein a single model and/or classification pipeline determines the cavity state, the lens state, and the food class). Training and using this multi-task classification system is more computationally challenging than training and using an additional separate single-task classification system that is trained exclusively for dirty camera detection.

Fourth, although the camera to processor communication can be slow, the method and system enable near-real-time classification by capturing multiple images after a first predetermined state change event (e.g., door open event, door close event, etc.) and processing one or more of the captured images using the classification system until the classification system achieves a pre-determined confidence level, which enables the method and system to determine a class label within a few milliseconds (e.g., hundreds of ms) of a second predetermined state change event (e.g., door close event) rather than waiting until the door close event to capture images, as is done in conventional systems.

Fifth, the inventors discovered that to satisfy memory constraints of the appliance, the sampling rate of cavity measurements can be predetermined based on the classification rate of the classification system, such that the sampling rate is slower than the classification rate.

However, the method and system can confer any other suitable benefits.

4. System

Figure 2:
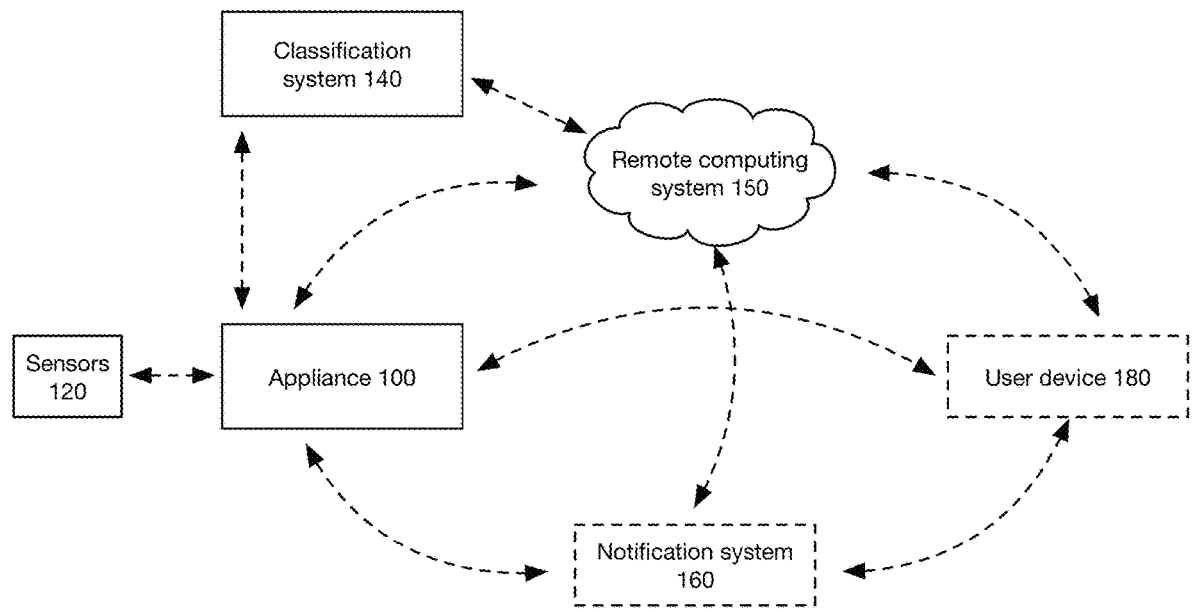
FIG. 2 is a schematic representation of the system.

The method is preferably performed using a system, as shown in FIG. 2, including: an appliance 100 with one or more sensors 120, a classification system 140, and a remote computing system 150. The system can additionally or alternatively include a notification system 160, a user device 180, or any other suitable components. However, the method can be performed with any other suitable system.

Figure 5:
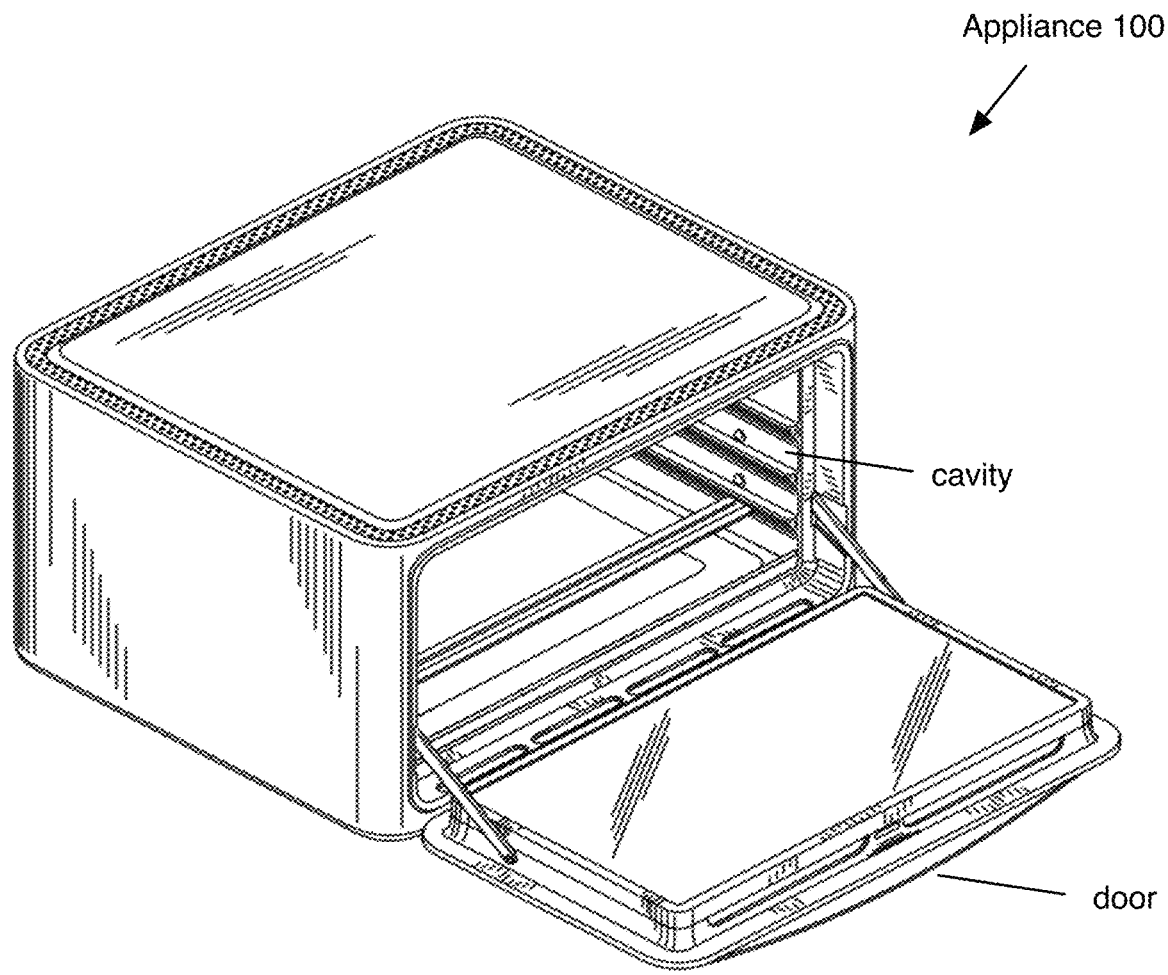
FIGS. 5-7 are schematic representations of variations of the appliance.
Figure 6:
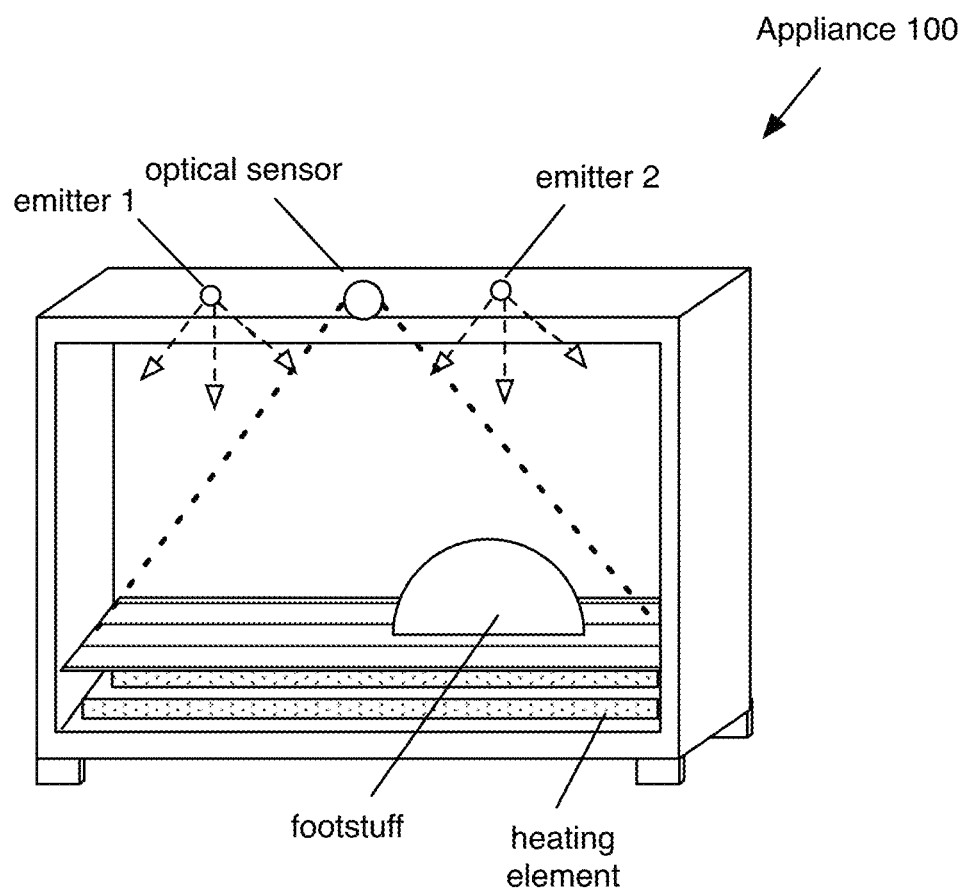
Figure 7:
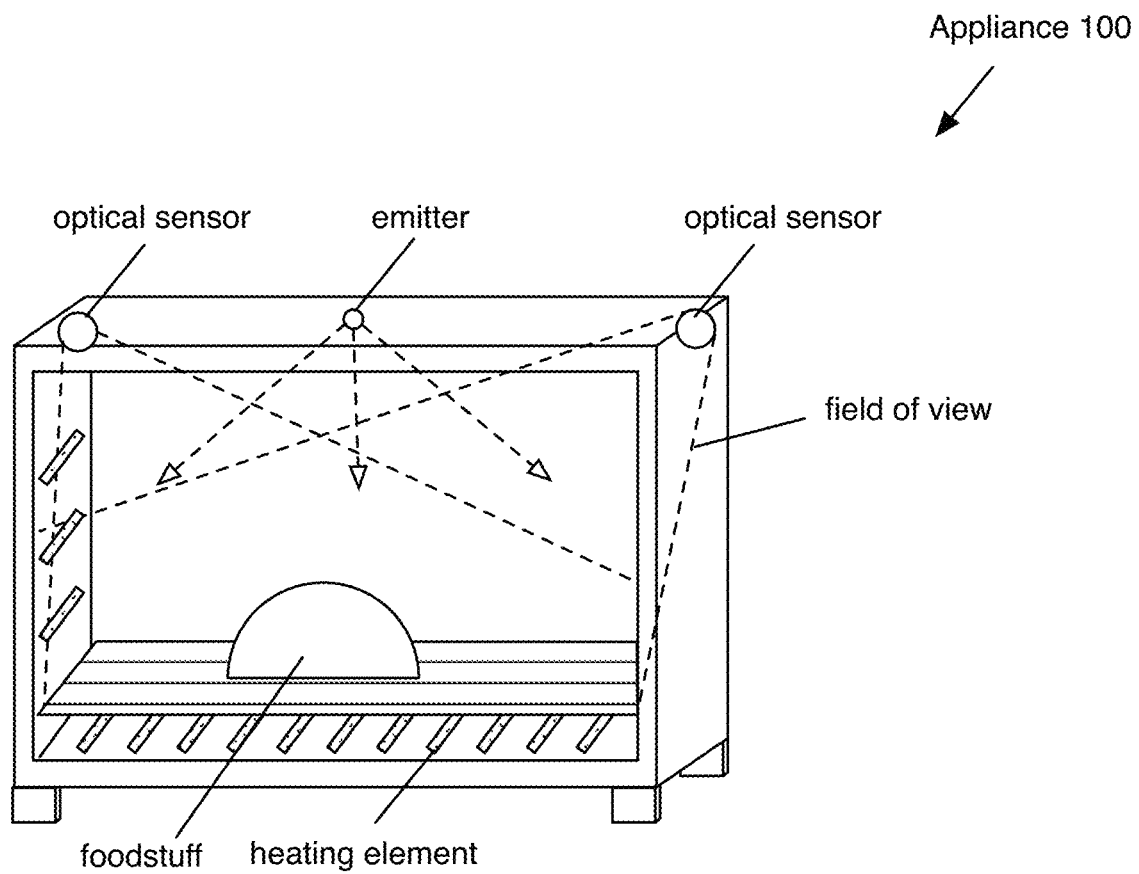

The appliance 100 can function to perform one or more elements of the method. The appliance can include memory (e.g., non-volatile, volatile, etc.) for which to store one or more class labels determined in S400. The appliance can include a processor for sampling and recording sensor measurements, a communication system (e.g., WiFi system, cellular system, Bluetooth system) for receiving and/or transmitting information (e.g., to and/or from the remote computing system and/or a user device), one or more emitters that emit signals that the sensors can measure, and/or any other suitable elements. Examples of appliances include: ovens (e.g., kitchen oven, industrial oven, microwave oven, etc.), cooktops, grills, smokers, and/or any other suitable appliance. Variants of the appliance are depicted in FIGS. 5-7. A specific example of an appliance is described in U.S. application Ser. No. 16/793,309 filed 18 Feb. 2020, which is incorporated herein in its entirety by this reference.

The appliance can define a cavity that receives food, accessories (e.g., plate, pan, baking sheet, pot, etc.), racks, and/or other items. The cavity can include heating elements, cooling elements, convection elements, and/or other cooking elements. The cavity can be made accessible through a door (e.g., side door, top door, etc.), or otherwise accessed. The cavity can be associated with cavity measurements that monitor parameters of the cavity. The cavity measurements are preferably used by the method for dirty camera detection, but can additionally or alternatively be used for determining a cook program, for determining a maintenance issue, and/or for any other suitable process. The cavity measurements can include images (e.g., still images, videos, etc.), audio, vibration, weight changes (e.g., in the overall appliance, in a rack weight), light sensors, temperature, proximity or occupancy measurements, and/or any other suitable measurement. Cavity parameters that can be monitored include: cavity occupancy (e.g., empty/occupied), temperature, light, food parameters (e.g., food class, food volume, food numerosity, food distribution, etc.), cavity noise, and/or any other suitable cavity parameter.

The appliance can include one or more emitters that function to emit signals that an optical sensor (e.g., image sensors, fiber optic sensors, photoelectric sensors, etc.) can measure. For example, the emitter can be a light emitter, wherein a camera records optical or visual images using light or other electromagnetic radiation emitted by the light emitter. The light can be: visible light, infrared, UV, and/or have another wavelength. In a second example, the emitter can be an acoustic emitter, wherein the acoustic sensor records acoustic images using acoustic waves emitted by the acoustic emitter. The acoustic waves can be: ultrasound, radar, and/or have another wavelength. However, the emitter can emit any other suitable signal.

However, the appliance can additionally or alternatively include any other suitable components that perform any other suitable functionalities.

The system can include one or more sensors 120 for determining sensor measurements. The sensor measurements can include: cavity measurements, event measurements (e.g., used in S100, such as door actuation measurements, etc.), and/or other measurements. The sensors are preferably integrated into the appliance, but can additionally or alternatively be separate. The sensors can include one or more optical sensors (e.g., image sensors, light sensors, fiber optic sensors, photoelectric sensors, etc.), audio sensors, temperature sensors, door sensors (e.g., a switch coupled to the door, etc.), power sensors (e.g., Hall effect sensors), inertial sensors (e.g., accelerators, gyroscope, magnetometer, etc.), 3D scanners, occupancy sensors (e.g., PIR sensor, ultrasonic sensor, microwave sensor, time of flight sensor, etc.), and/or any other suitable sensors. The sensors can be directly or indirectly coupled to the cavity. The sensors can be connected to and controlled by the processor of the appliance, a user device, or be otherwise controlled. The sensors are preferably individually indexed and individually controlled, but can alternatively be controlled together with other sensors.

The sensors and/or any associated processing systems (e.g., chipsets) can be arranged along the top of the cavity (e.g., distal the heating elements 300, distal the feet, etc.), arranged along the side of the cavity, arranged along the bottom of the cavity, arranged in a corner of the cavity (e.g., upper right, upper left, etc.), arranged in the door of the cavity (e.g., supported by the inner door wall, supported by the outer door wall, be integrated into the user interaction unit, etc.), and/or be supported by any other suitable portion of the appliance. Alternatively, the associated processing systems can be arranged separate from the respective sensors (e.g., be part of the processing system, be part of a remote computing system, etc.).

In one variation, the sensors can include an optical sensor that functions to measure optical data about the cavity (e.g., foodstuff within the cooking cavity). In a first embodiment, the sensor includes a camera configured to record images or video of the cavity (e.g., food cooking within the cavity). The camera can be a CCD camera, stereocamera, hyperspectral camera, multispectral camera, IR camera, visual range camera, video camera, wide angle camera (e.g., a fisheye camera with a fisheye lens, a rectilinear camera with a rectilinear lens, etc.), or any other suitable type of camera. In a specific example, the wide-angle camera can have an approximately 180-degree field of view (e.g., within 10 degrees or less). The camera is preferably thermally connected to the cavity (e.g., is subjected to cooking temperatures), but can alternatively be thermally insulated from the cavity and/or otherwise thermally connected to the cavity. The camera can be arranged next to (e.g., on the same wall as, within a threshold distance of, etc.) a heating element, or be arranged distal the heating elements. The camera can be cooled by convection elements, cooled by a separate cooling system (e.g., a radiator and fan, watercooling, etc.), or remain uncooled. The camera can record images using radiation emitted or reflected by the heating elements, by the foodstuff, by the oven walls, by an emitter, or by any other suitable radiation source. Alternatively or additionally, the camera can record images using ambient light.

The camera can be mounted to the cavity wall, but can alternatively be mounted to the door (e.g., door interior, door exterior), and/or another portion of the appliance. The camera is preferably mounted to an interior cavity wall, but can alternatively be mounted to an exterior cavity wall (e.g., wherein the cavity is dual-walled), mounted to a cavity threshold (e.g., to the door frame), and/or mounted to another portion of the cavity. The camera lens is preferably flush with the cavity wall, but can alternatively be recessed or protrude from the cavity wall. The camera can be centered along the respective appliance surface, offset from the appliance surface center, or be arranged in any other suitable position. The camera can be statically mounted to the appliance surface, movably mounted to the appliance surface (e.g., rotate about a rotational axis, slide along a sliding axis, etc.), or be otherwise coupled to the appliance. The appliance can include one or more cameras. The cameras can be substantially identical or be different. The cameras can be evenly distributed throughout the cavity (e.g., symmetrically distributed), or be unevenly distributed.

The camera can have a constant frame rate (sampling rate), variable frame rate, or any other suitable frame rate. For example, the frame rate can be dynamically adjusted to accommodate for the processing speed of the classification module. The camera can have a static field of view, variable field of view, or other suitable field of view. The camera is preferably arranged with its field of view (FOV) directed at the cavity, but can alternatively be otherwise arranged. The FOV (single or combined) preferably substantially encompasses the entirety of the cavity, but can alternatively encompass a subset of the cavity or encompass any other suitable portion of the cavity. The FOV preferably encompasses at least the food tray or bottom of the cavity, but can additionally or alternatively encompass the front, back, walls, top, or any other suitable portion of the cavity. The camera is preferably sensitive to (e.g., measure in the spectral wavelength of) visual light, but can alternatively or additionally be sensitive to infrared light, ultraviolet light, or any other suitable electromagnetic wavelength.

As shown in FIG. 6, in a first variation, the appliance includes a single camera mounted to the top of the cavity and directed with the FOV toward the cavity bottom. In a second variation, the appliance includes a single camera of limited view (e.g., wherein the FOV is less than a majority of the cavity), wherein the camera is directed toward a food pan (e.g., tray) proximal the heating elements.

As shown in FIG. 7, in a third variation, the appliance includes a first and second camera having different FOVs (e.g., arranged along different sides of the appliance and directed in opposing directions) directed at the food pan. In this variation, a virtual 3D model can be constructed from the images recorded by the first and second cameras. However, the appliance can include any other suitable camera.

However, the one or more sensors can additionally or alternatively include any other suitable components.

The system can optionally include a classification system 140 that functions to identify food classes (e.g., food types). The classification system can optionally: determine the cavity occupancy state (e.g., empty, occupied or full), determine the camera cleanliness state (e.g., dirty, clean, intermediary states therein), food quantity, determine food instance count, determine food distribution within the cavity, and/or determine any other suitable cavity parameter. The classification system can be locally executed on the appliance, remotely executed on the remote computing system, distributed between the two, or otherwise executed.

The classification system preferably receives the cavity measurements as inputs, but can alternatively receive user inputs, historical states, other sensor measurements, and/or any other suitable information as inputs. The classification system preferably determines all classifications based on images of the cavity, but can additionally or alternatively determine classifications based on system weight (and/or weight changes), occupancy measurements, and/or any other suitable measurement.

The classification system can include: a single model (e.g., single classifier), an ensemble or cascade of different classifiers (e.g., each triggered by a predetermined output of an upstream models), and/or any other suitable set of classifiers. The classifier can be a trained neural network, a regression, a support vector machine (SVM), a clustering algorithm, a graphical model, a set of equations, a lookup table, decision tree, one or more heuristics, and/or another model. The neural network can be a CNN, DNN (e.g., deep neural network), deep residual network, recurrent neural network (RNN), feed forward network, and/or another architecture. The classifier(s) within the classification system can be trained using supervised, semi-supervised, unsupervised, and/or other training methods. The classifier can be trained using training data (e.g., discussed below), or using any other suitable data.

The one or more heuristics can include: hard coded features (e.g., smudges, color, unexpected warping, occlusions, etc.), cook history (e.g., certain foods cause an appliance to become dirty faster, such as greasy foods), predetermined period of cook time (e.g., up to 4 hours, up to 5 hours, up to 6 hours, up to 7 hours, up to 8 hours, up to 9 hours, up to 10 hours, etc.), a predetermined set of conditions (e.g., all food classification confidence levels consistently below a threshold for a minimum number of consecutive cook sessions or images), differences from a reference image (e.g., generic reference image; reference image for the specific appliance, sampled when the appliance is in a reference state, such as a clean camera state), and/or any other suitable heuristic.

In a first variation, the classification system can be a single neural network trained to identify multiple classes (e.g., a multiclass classifier), wherein each class can be representative of one or more components or parameters (e.g., food, count, pan-quantity, cavity state, camera state, etc.). In a specific example, the multiple classes includes: one or more food classes, one or more cavity occupancy states (e.g., empty/occupied), and one or more camera cleanliness states (e.g., clean, slightly clean, slightly dirty, very dirty, etc.). In a second specific example, the classification system can identify one or more food classes, and one or more multi-component state combinations for the cavity occupancy and camera state (e.g., "empty-dirty," "empty-clean," "full-dirty," "full-clean," and/or other state combinations).

In a second variation, the classification system can include multiple classifiers, each trained to identify one or more classes. wherein each class can be representative of a different component or parameter. In a specific example, the classification system includes one or more food classification models, a camera cleanliness model, and optionally a cavity occupancy model. All of the classifiers are preferably multiclass classifiers, but can alternatively be a unary classifier (e.g., one-class classifier). The system can optionally combine or interpret the results of one model in light of the results of the other model(s) for appliance control. For example, the camera can be considered dirty when the cavity occupancy model identifies that the cavity is empty and the camera cleanliness model identifies that the camera is dirty, while the camera cleanliness model output can be ignored when the cavity is classified as occupied.

The system can optionally include a processing system that functions to control appliance operation based on the classification results (e.g., select the cook program based on the food class; determine whether to trust the food class based on the camera cleanliness class; etc.). The processing system can optionally perform all or part of the method. The processing system can include one or more processors (e.g., microprocessors, CPU, GPU, etc.), memory (e.g., volatile, nonvolatile, etc.), and/or any other suitable hardware. The processing system preferably includes the classification system and notification system, but can alternatively be separate from the classification system and notification system. The processing system can be: local to the appliance (e.g., local computing system), remote from the appliance (e.g., a remote computing system), include both a local and remote component, be distributed (e.g., across multiple appliances), and/or be otherwise configured.

The system can optionally include a remote computing system 150 (e.g., server system; platform; etc.). The remote computing system can train the classification system. The remote computing system can optionally function to perform the method (or a subset of elements thereof). In variants where the remote computing system performs some or all of the method, the cavity measurements for an appliance can be sent to the remote computing system via a communication channel. The communication channel can be a wired connection or wireless connection, and can be the Internet, cellular connection, WiFi, using a user device as an intermediary, and/or be another communication channel. The remote computing system can optionally store all cavity measurements from all appliances (or a subset of images thereof). The cavity measurements can optionally be associated with a class label (e.g., a food class label, a cavity occupancy label, a camera cleanliness label, etc.), wherein the class label can be: automatically determined (e.g., by the remote computing system, by the classification system, etc.), determined by the appliance's user, determined by a third party, or otherwise determined. However, the remote computing system can additionally or alternatively perform any other suitable functionality.

The system can optionally include a notification system 160, which can function to send notifications to the user when the class label is indicative of a dirty camera lens. The user that the notifications are sent to is preferably associated with the appliance (e.g., wherein the appliance or camera identifier is stored in association with the user account), but can alternatively be the user using the appliance, any user proximal the appliance, and/or another user. The notification system can be integrated into the appliance or it can be separate. The notification system can be included in the remote computing system or it can be separate. The notification system 160 can be: a user output on the appliance (e.g., a touchscreen interface, a display, a speaker, a notification light, etc.), a mobile application (e.g., executing on a user device, such as a smartphone or a tablet, etc.), a dashboard (e.g., web browser dashboard), and/or any other suitable notification system. In one example, the notification system 160 wirelessly communicates the notification to a user device 180 (e.g., via a short-range communication system, such as Bluetooth, via the remote computing system, etc.). In a second example, the notification system is part of the remote computing system, wherein the remote computing system sends the user a notification (e.g., via the mobile application, via a web dashboard, etc.) when the dirty camera is detected (e.g., by the appliance, by the remote computing system, etc.).

However, the system can additionally or alternatively include any other suitable components that can perform any other suitable functionalities.

5. Method

The method for dirty camera detection preferably includes: detecting a first predetermined state change event S100, sampling a set of cavity measurements S200, optionally determining a set of features of the set of cavity measurements S300, determining a class label based on the cavity measurements S400, optionally verifying the class label S500, and facilitating use of the appliance based on the class label S600. The method can additionally or alternatively include determining a set of training data S700, training the classification system S800, and/or any other suitable elements.

The method preferably functions to determine if a camera lens is dirty, but can additionally or alternatively determine whether the cavity is occupied, identify the food within the cavity and/or parameters thereof, and/or perform any other suitable functionality. A camera lens can be considered dirty when: the camera's view of the cavity is obstructed by a predetermined amount (e.g., 10%, 20%, 30%, 40%, 50%, 60%, 70%, 80%, 90%, etc.); image is abnormally warped; foreign matter is continuously detected in the image; objects less than a threshold distance away from the camera are consistently detected; less than a threshold amount of light is detected at the camera; and/or when other conditions are met.

All or portions of the method can be performed in real- or near-real time, or asynchronously. All or portions of the method can be performed at the edge (e.g., by the appliance, by a user device connected to the appliance, etc.) and/or at the remote computing system.

The method can be performed for every cavity measurement, every X cavity measurements (e.g., every 2, 5, 10, 30, 100, or other number of cavity measurements), cavity measurements satisfying a predetermined set of conditions, every state change event instance, every X state change events (e.g., every 2, 5, 10, 30, 100, or other number of state change events), and/or any other suitable set of cavity measurements.

In variants, the method can be performed for every image, every X images, images satisfying a predetermined set of conditions (e.g., associated with less than a threshold acceleration or motion, less than a threshold blur, etc.), every cavity measurement set (e.g., associated with a single state change event instance), and/or any other suitable set of images or other sensor measurements.

Detecting a first predetermined state change event S100 functions to determine when to start sampling the set of cavity measurements for S200 and/or for S700, but can alternatively function to indicate when to stop sampling cavity measurements. The state change event is preferably selected to correspond with an empty cavity (e.g., ensure or have a strong correlation with an empty cavity), but can additionally or alternatively be selected to correspond with an occupied cavity (e.g., ensure or have a strong correlation with an occupied cavity), with food presence, and/or with any other suitable cavity or food state. S100 can be performed by the appliance, by the remote computing system (e.g., based on sampled signals from the appliance), and/or any other suitable system.

A state change event can be determined based on one or more sensor measurements (e.g., door sensor triggers; door opening; door closing; increase in cavity weight, decrease in cavity weight, etc.), user inputs (e.g., at the appliance, at a user device connected to the appliance, etc.), and/or determined based on any other suitable input. The state change event can include: door state (e.g., door open; door close; door actuation, such as door opening, door closing, etc.); an event series (e.g., door open and close; increase in cavity light then decrease in cavity light, etc.); cavity light changes (e.g., increase in cavity light not due to appliance light control; decrease in cavity light not due to appliance light control; etc.); weight changes (e.g., rack weight increase or decrease, appliance weight increase or decrease, etc.); appliance jostling (e.g., the onboard IMU sensing vibrations above a threshold); sampling schedule satisfaction (e.g., wherein images are sampled at a predetermined frequency); a combination thereof; and/or any other suitable event, determined based on event measurements sampled by the respective sensors.

Detecting a state change event can optionally include processing a sampled signal (e.g., event measurement) to detect the first predetermined state change event, which can include: filtering (e.g., low-pass filter, high-pass filter, band-pass filter, etc.), thresholding (e.g., values above or below a threshold can indicate the first predetermined event), applying machine learning techniques (e.g., RNN, CNN, GAN, clustering, regression, decision tree, etc.), heuristics, and/or any other suitable processing technique.

In a first variant, detecting a first predetermined a state change event can include sampling a signal on a schedule and processing the signal to determine the first predetermined state change.

In a second variant, a switch changing state (e.g., from a closed state to an open state) can be indicative of a first predetermined state change event. In a specific example, this can include detecting a door open event. In a second specific example, this can include detecting a door close event.

However, detecting a first predetermined a state change event can additionally or alternatively include any other suitable elements.

Sampling a set of cavity measurements S200 functions to sample measurements for subsequent cavity characterization. Sampling the set of cavity measurements is preferably performed in response to detection of the first predetermined state change event, but can additionally or alternatively be performed periodically at a predetermined interval (e.g., every 30 seconds, every minute, every 5 minutes, once a day, etc.), in response to a second state change event (e.g., in a series of state change events), a predetermined period of time after state change event occurrence, and/or at any other suitable time. The set of cavity measurements can be sampled at a predetermined sampling rate (e.g., every 30 milliseconds, every 40 milliseconds, every 300 milliseconds, every 400 milliseconds, etc.), processing rate, at a maximum sampling rate, and/or at any other suitable rate, but can additionally or alternatively be sampled once, when the image is unclear (e.g., when the image is blurry, when the image classification is unknown, when the class probabilities are all below a threshold value, etc.), and/or any number of times. In a specific example, the method starts sampling images when the door is opened, and continues to sample images for a predetermined time period after the door is closed.

The set of cavity measurements can include images, videos, audio, vibration, weight changes, light changes, temperature, and/or any other suitable measurement.

S200 can optionally include selecting one or more of the candidate measurements from a set of cavity measurements. Selecting one or more of the candidate measurements can be performed based on measurement quality, metadata associated with each candidate measurement, other cavity measurements related to one or more components of the appliance, the cavity state (e.g., empty or full), based on heuristics or a rule (e.g., always select the third image), image parameters (e.g., such as blur, or image-associated metadata, such as IMU data or lighting data), and/or any other suitable information. For example, images from a series of images based on image quality (e.g., blur, exposure, etc.), image lighting (e.g. highlight, lowlight, etc.), image-associated metadata (e.g., IMU data, lighting data, etc.), and/or any other suitable information and using the one or more selected images as the cavity measurement(s). In a specific example, determining one or more cavity measurements can include selecting the best image from the set of sampled images and use the best image as the cavity measurement (e.g., classify the best image).

S200 can optionally include down sampling the set of cavity measurements (or subset thereof) and using the down sampled cavity measurement(s) as the cavity measurement(s). In a first example, sampling a set of cavity measurements includes down sampling one or more images and using the one or more down sampled images as the cavity measurement(s).

In a fourth variant, the set of cavity measurements can be used as training measurements in S700. When the cavity measurements are used as training measurements, the cavity measurements can be down sampled (e.g., as described above), filtered based on the cavity state, and/or otherwise used as training measurements.

However, sampling the set of cavity measurements can additionally or alternatively include any other suitable elements.

The method optionally includes determining a set of features of the set of cavity measurements S300, which can function to determine features that can be used as additional and/or primary inputs to the classification system in S400, and/or provide any other suitable functionality.

The set of features can include: food parameters (e.g., counts of food instances, food distribution within the cavity, food coloring, food size, etc.); structural computer vision features (e.g., edges, corners, points of interest, regions of interest, ridges, etc.), and/or any other suitable feature.

Determining the set of features can include using feature detectors (e.g., neural networks, such as CNN, DNN, etc. that were trained to detect the respective feature, edge detectors, corner detectors, region detectors, ridge detectors, scale-invariant feature transforms, etc.), feature extractors (e.g., ICA, PCA, kernel PCA, multilinear principal component analysis, etc.), and/or any other suitable technique.

However, determining a set of features can additionally or alternatively include any other suitable elements.

The method preferably includes determining a class label based on the set of cavity measurements S400, which can function to classify the one or more cavity measurements to determine the state (e.g., dirty, clean, etc.) of the camera lens. Determining a class label can be performed after S200, after S300, and/or at any other suitable time. Determining a class label can be performed for all cavity measurements received from S200 (and/or a subset thereof).

Determining a class label for a cavity measurement can be performed by the classification system 140, but can additionally or alternatively be performed by another classification system, and/or any other suitable system.

The classification system can receive as input the set of cavity measurements from S200, the set of features from S300, other sensor measurements (e.g., concurrently sampled with or asynchronously sampled from the cavity measurements), and/or any other suitable elements.

In a first variation, the classification system determines a class label based on a single image.

In a second variation, the classification system determines the class label based on multiple images. In a first example, a voting mechanism can be used to determine the class label (e.g., candidate class labels can be determined for each image and the candidate class label with the most votes can be selected as the class label). In a second example, the classification system can receive as input multiple input images which can all (or a subset thereof) be used to determine the class label (e.g., wherein the classification system is a multi-headed classifier).

In a third variation, the classification system determines the class label based on at least one image and auxiliary data (e.g., other sensor measurements of the set of cavity measurements). In a first example, a voting mechanism can be used to determine the class label (e.g., the image and the auxiliary data can be independently processed to determine candidate class labels and the candidate class label with the most votes can be selected as the class label). The candidate class labels in the voting mechanism can be weighted and/or unweighted. In a second example, the classification system can receive as input multiple inputs, such as both the images and the auxiliary data, which can all (or a subset thereof) be used to determine the class label.

In a fourth variation, the classification system determines the class label by comparing a first cavity measurement sampled before the first predetermined state change event is detected (e.g., last image sampled before state change event detected; reference image; etc.) with a second cavity measurement sampled after first predetermined state change event is determined. The first cavity measurement can be a reference measurement (e.g., sampled when the camera is known to be clean), a measurement sampled a predetermined duration before the second measurement, a measurement sampled in a prior cooking session, a measurement sampled immediately before the state change event, and/or any other suitable measurement. In one embodiment, the class label can be determined based on the difference between the pre- and post-measurements. For example, the class label can be determined based on: the addition or removal of an item, a lighting change exceeding a threshold, a focal change more than a threshold amount (e.g., in variants where the camera auto-focuses on proximal objects), and/or any other suitable measurement difference. The class label can be looked up, calculated, estimated, classified using a neural network, or otherwise determined.

In a fifth variant, the classification system determines the class label using a trained neural network (e.g., DNN, CNN, RNN, feed forward, etc.), trained using labelled training data (e.g., manually labeled training data, automatically labeled training data, etc.), but can additionally or alternatively include using a cascade of neural networks, a decision tree (e.g., based on features extracted from the image), and/or otherwise classified. In a first embodiment, the same neural network can output individual food classes (e.g., food type, such as bagel, chicken, bacon; accessory type; number of food items; volume of food items; etc.) in addition to the cavity state and/or camera state (e.g., empty cavity and clean camera; empty cavity and dirty camera); food parameters; and/or other classes. This embodiment can be particularly useful when the method is performed at the edge (e.g., onboard the appliance, using limited computational power). In a second embodiment, the classification can be performed using a cascade of classifiers (e.g., neural networks). For example, a first classifier can classify the image as an empty cavity or not-empty cavity; a second classifier can classify images previously classified as an empty cavity with a dirty or not-dirty camera state; and an optional set of classifiers can classify images previously classified as not-empty cavities with a food class. In a third embodiment, the classification system includes a 3-class classifier (e.g., empty cavity and clean camera; empty cavity and dirty camera; food), wherein the classification system includes one or more food classifiers (e.g., to determine the food type) that are executed in response to image classification as food. However, the cavity state, the camera state, food class, and/or other parameters can be otherwise determined.

The classification system can determine a class label from a set of class labels based on the input. The set of class labels can represent or characterize: different camera states (e.g., dirty, slightly-dirty, different dirtiness levels, clean, up to 10% obscured, up to 50% obscured, etc.), cavity state (e.g., empty, such as no food present; occupied, such as food present, accessory present; clean; dirty; slightly dirty; dirtiness score; etc.), food type (e.g., food class), number of food items, quantity and/or portion size of food item(s) (e.g., relative to an accessory volume or area, relative to the oven volume or area, etc.), food distribution within the cavity, a combination thereof, and/or any other suitable characteristic of the food, sensor(s) (e.g., optical sensor), cavity, or other component. The class label can be text, numbers, symbols and/or any other suitable representation. Each class is preferably a binary class (e.g., clean or dirty, empty or occupied, etc.); but can additionally or alternatively be discrete classes with multiple potential values; continuous classes; and/or have another characteristic.

In a first variant, a single class label within the set of class labels can represent the states of multiple separate components. For example, a single class label can represent both a cavity state and a camera state. In this example, different class labels can represent different combinatorial permutations of the different component states. In a specific example, a first class can include an empty cavity and clean camera; a second class can include an empty cavity and dirty camera; and a third class can include food presence. Alternatively, each class within the class set can represent a single component's state or class. In a first example, the camera state is directly classified. In a second example, the camera state is classified in conjunction with the cavity state (e.g., cavity fill state, such as empty or non-empty).

The class label can be associated with a confidence score (e.g., value between 0-1, value between 0-100, etc.), be associated with a binary score (e.g., 0 or 1; yes or no; etc.), and/or be associated with any other suitable score determined by the classification system. Alternatively, the class label can be the confidence score which can represent a dirty camera score.

S400 preferably determines multiple classes from a single input set (e.g., single image), but can alternatively determine a single class from a single input set or any suitable number of classes from an input set. Multiple classes can be concurrently, contemporaneously, serially, or otherwise output. For example, the classification system can concurrently output confidence scores for each food type, in addition to confidence scores for each component state (e.g., clean; dirty; empty; full; clean-empty; dirty-empty; dirty-full; clean-full; slightly dirty-empty; slightly-dirty full; etc.). However, the classification system can output classifications in any other suitable manner.

When the multiple classes include values for different components, the different outputs can be analyzed together or in light of their respective subgroup. For example, when the multiclass classification system outputs probabilities for each of a plurality of food classes and cavity occupancy-camera cleanliness state permutations, the food classes can be analyzed independent of the cavity occupancy-camera cleanliness state permutations. In an illustrative example, the food class with the highest probability can be the food class that is used, and the cavity occupancy-camera cleanliness state permutation with the highest probability can be used. In a second illustrative example, the cavity occupancy-camera cleanliness state permutation subgroup can be analyzed first, and the food classes can be considered when the cavity occupancy-camera cleanliness state indicates that the cavity is occupied and the camera is clean (e.g., above a predetermined threshold). In an alternative example, all the output classes can be evaluated together, wherein the class with the highest probability is used. However, the output can be otherwise analyzed.

S400 can include updating the cavity and/or camera class label based on a series of cavity measurements (e.g., determining a first class label for a first cavity measurement and updating the class label after a predetermined number of additional class labels are determined).

In a first variant of S400, updating the class label can include receiving sampled cavity measurements that are sampled at a predetermined frequency in response to occurrence of the first predetermined state change event, wherein every cavity measurement can be classified (e.g., in real time, as a batch after sampling, etc.). In this variant, the method can store and update the best classification result (e.g., the result with the highest confidence score) as sequential cavity measurements are processed, wherein the best classification result after a first predetermined state change event termination (e.g., after a second predetermined state change event such as a door close event, after a predetermined period from detecting a second predetermined state change event, etc.) is used as the class label. In this variant, the method can store and update the best class label (e.g., the result with the highest confidence score) as sequential cavity measurements are processed, wherein the best class label after state change event termination is used as the class label.

Determining a class label for a cavity measurement can optionally include using the class label to update the classification system (e.g., parameters of one or more classifiers). In a first example, when the classification system includes a neural network, the class label determined by the neural network can be used to adjust the parameters of the neural network and/or activation thresholds. In a second example, when the classification system includes a first classifier (e.g., sensor state classifier) and a food classifier, the class label determined by the first classifier can be used to update the parameters and/or activation thresholds of the food classifier.

Determining a class label for a cavity measurement can optionally include post-processing the class label to perform dirty camera detection (e.g., based on the binary determination, based on the amount of camera obstruction, etc.).

However, determining a class label for the cavity measurement can additionally or alternatively include any other suitable elements.

The method optionally includes verifying the class label S500, which can function to confirm that the class label is correct. This can be useful to prevent false positives, which can be detrimental to the user experience, as variants of the system use the class label to selectively control (e.g., enable) appliance use, notify users, or perform other downstream functionalities (e.g., S600). S500 is preferably performed before S600 and after S400, but can be performed at any other suitable time. The class label can be verified using: a voting mechanism (e.g., wherein each classification from a sliding window of historic camera dirtiness classifications contributes a vote); a filter (e.g., predicting a hidden, true camera state); a set of rules (e.g., when at least a predetermined proportion of class labels matches the class label; when a predetermined number of consecutive class labels match; etc.); a set of heuristics; and/or otherwise verified.

In a first variant, verifying that the camera is dirty can be performed when the class label is indicative of a dirty camera state, but can alternatively be performed for every image or otherwise performed. In one example, the method includes: storing a classification history including the last N class labels (e.g., storing a sliding window of cavity and/or camera state classifications, wherein a most recent sliding window can include the current classification and a predetermined number of previous classifications, such as 10, 15, 20, 25, 30, 35, 40, etc.) at the appliance in non-volatile memory; retrieving the classification history (e.g., in response to class label indicative of a dirty camera state);

and verifying that the camera is dirty when the classification history satisfies a predetermined condition. The window can be a time window (e.g., measured from a current time or a reference time), a number of classification or measurement instances, a number of cook sessions, and/or otherwise defined. The predetermined condition can include: a predetermined number of (consecutive or nonconsecutive) dirty camera classifications (e.g., including or irrespective of the current dirty classification) within the classification history (e.g., less than 30, less than 20, less than 10, more than 10, more than 15, more than 20, etc. dirty camera classifications within the last 30 classifications, 40 classifications, 50 classifications, etc.); a predetermined number of (consecutive or nonconsecutive) dirty camera classifications for images of empty cavities that can include the most recent classification; the current classification being a dirty classification; and/or another predetermined condition.

In a second variant, the class label can be used to update a current belief of the camera state, wherein the current belief is determined based on whether at least M out of the last N class labels are indicative of a dirty camera state (e.g., wherein M is less than N), wherein the M class labels can include the most recent classification. The current belief can be used to determine when to perform S600 (e.g., when to facilitate camera cleaning).

In a first example, verifying the class label can include storing a classification history including the last N class labels (e.g., up to 10, up to 15, up to 20, up to 25, up to 30, up to 35, up to 40, up to 45, up to 50, etc.) output by the classification system in S400; and outputting the class label "dirty camera" if at least M (e.g., 5, 10, 15, 20, etc.) out of the last N verdicts are "empty-cavity-dirty-camera" and the most recent verdict is "empty-cavity-dirty-camera".

However, verifying the class label can additionally or alternatively include any other suitable elements.

The method preferably includes facilitating use of the appliance based on the class label S600, which can function to notify the user to perform an action, automatically perform an action (e.g., at the appliance, such as cooking the identified food), and/or perform any other suitable functionality. S600 can be performed based on the values of one or more of the class labels output by the classification system (e.g., for a single cook session, single predetermined state change event, etc.), based on the verified class label determined in S500, and/or based on any other suitable information. S600 is preferably performed after S400, but can additionally or alternatively be performed after S500, and/or at any other suitable time. S600 can be performed multiple times per a single class label (e.g., when the class label is "dirty camera", then the user can be notified multiple times to clean the camera).

Figure 10:
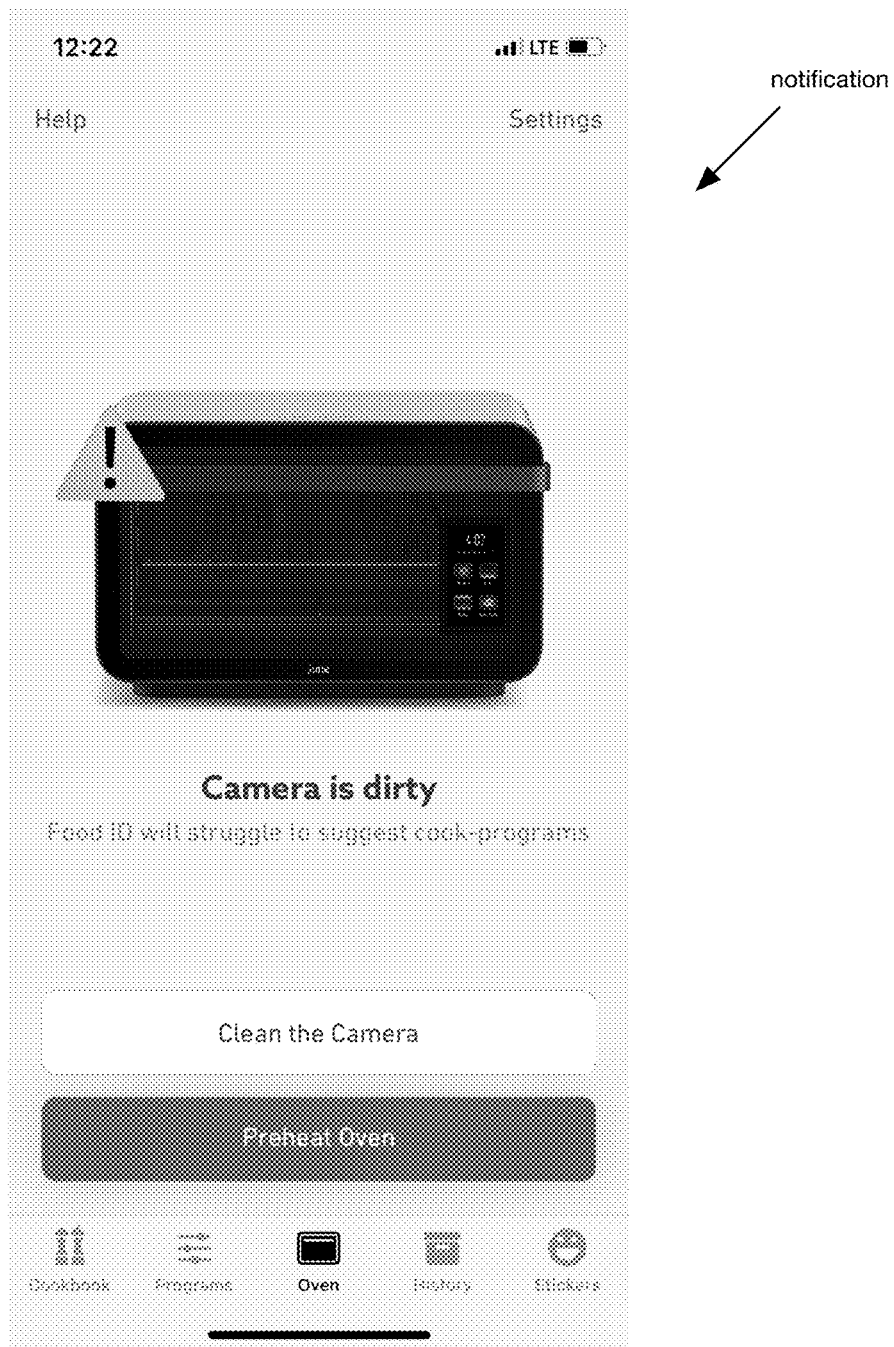
FIGS. 10-12 are specific examples of notifications for appliance users.
Figure 11:
Figure 12:
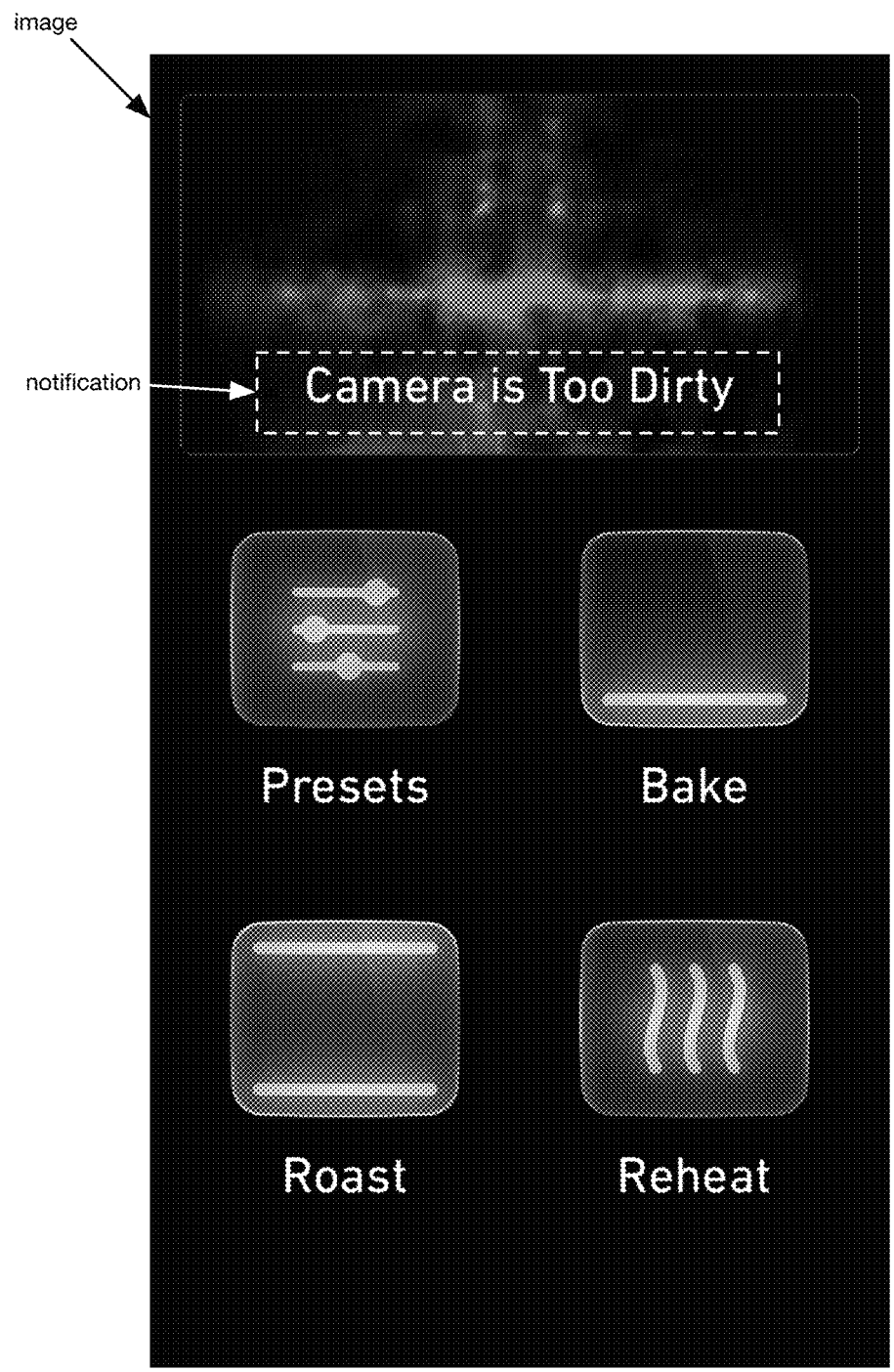

In a first variant, facilitating use of the appliance can include facilitating camera cleaning in response to dirty camera class label (and/or empty cavity-dirty camera class label), which can include: scheduling or sending a notification to a user (e.g., on the appliance, on a user device); automatically purchasing cleaning supplies; automatically cleaning the cavity; or otherwise facilitating camera and/or cavity cleaning. The notification can be a push notification, text message, email, badge, phone call, message on a social platform, and/or any other suitable notification. The notification can include: cleaning instructions, the image from which the dirty camera state was determined, automatic cleaning options (e.g., an icon to trigger self-cleaning), and/or other information. The notification can be sent to and/or presented on: the appliance (e.g., on an on-appliance display), a user device (e.g., smartphone, smartwatch, television, etc.), and/or any other suitable display. The notifications can be sent: once, repeatedly, according to user preferences (e.g., rescheduled by the user and/or automatically rescheduled), at an exponentially decreasing frequency (e.g., exponential backoff), or at any other suitable time or frequency. The notification can be presented: only when the cavity temperature is less than a predetermined threshold, or when any other suitable set of presentation conditions are met. Specific examples of notifications are depicted in FIGS. 10-12.

In a second variant, facilitating use of the appliance can include executing a cook program. This preferably occurs when the camera is classified as clean (e.g., in a prior cavity evaluation session; after a prior cook session; etc.), but can additionally or alternatively be performed when the camera is classified as dirty. The cook program is preferably associated a food class identified based on the cavity measurements, but can additionally or alternatively be a predetermined cook program and/or any other suitable cook program.

In a first example, the camera is classified as clean based on an image sampled after a prior cook session (e.g., after the door is closed and the cavity is classified as empty). When food is detected and classified in the next cook session (e.g., based on an image sampled after the door is closed), the system can retrieve the prior camera classification, and retrieve the cook program when the camera classification is clean (and/or more than a threshold proportion clean).

In a second example, if the class label indicates that the cavity is empty and the camera is clean, then the appliance can execute a turn on process (e.g., pre-heat) of a cook program, wherein the cook program can be determined based on the class label, more specifically the food type present in the cavity.

In a third variant, facilitating use of the appliance can include selectively disabling appliance functions (e.g., computer-vision-dependent functions) in response to the class label indicative of a dirty camera (e.g., dirty camera-full cavity, dirty camera-empty cavity, etc.). For example, the method can selectively disable automatic: food detection, food classification, appliance preheating, food instance counting, food quantity estimation, accessory detection, and/or other computer-vision-based functions. Disabling these functionalities can include: ignoring the food classifications, not passing the image to the food classifier(s), not retrieving the cook programs associated with the identified food class, and/or otherwise disabling the functionalities. The method can optionally include defaulting to secondary or fallback methods for the automatic functionality, such as requesting manual input. Additionally or alternatively, the method can select different additional classifiers for the same functionalities (e.g., classifiers that are less reliant on image quality), or otherwise manage appliance functionality.

In a fifth variant, facilitating use of the appliance can include requesting user input before cooking food subsequently placed in the cook cavity. This preferably occurs when the camera is classified as dirty (e.g., in a prior cavity evaluation session; after a prior cook session; etc.), but can additionally or alternatively be performed when the camera is classified as dirty. User input can be requested at an appliance interface, on a user device (e.g., as a notification), and/or otherwise requested from the user.

However, facilitating use of the appliance can additionally or alternatively include any other suitable elements.

The method optionally includes determining a set of training data S700, which can be used to train the classification system in S800. The set of training data can be simulated cavity measurements (e.g., manually, computationally, etc.), real-world cavity measurements (e.g., crowdsourced from a plurality of different connected appliances), such as the cavity measurements from S200 or different cavity measurements, and/or otherwise generated. For example, the training data can include: images of empty cavities taken with clean cameras and dirty cameras, images of occupied cavities taken with clean cameras and dirty cameras, and/or images of dirty cavities taken with clean cameras and dirty cameras.

Determining the set of training data can optionally include determining a class label for each training cavity measurement (or a subset thereof) using manual labeling, automatic labelling, and/or other labelling methods. Each training cavity measurement can be assigned one or more class labels, but can additionally be assigned a likelihood associated with each assigned class label and/or otherwise labelled or not labelled. However, S700 can additionally or alternatively include any other suitable elements.

The method optionally includes training the classification system S800, which can function to determine an optimal set of weights for the classification system based on the set of training data from S700. The classification system can be trained using supervised learning, unsupervised learning, and/or other training techniques. When the classification system includes a neural network, the classification system can be trained using gradient descent, Newton method, Quasi-Newton method, Levenberg-Marquardt algorithm, and/or any other suitable training algorithm. However, S800 can additionally or alternatively include any other suitable elements.

In a first illustrative example of the method, an oven automatically detects and notifies its users when the camera inside the oven gets dirty and prevents smart features to function. The smart oven provides variety of smart features to make cooking easy and efficient. These smart features, for example, food identification, automated cooking, and predicting the completion time of cooking, often employ a camera in the oven. The performance of these smart features degrades when the camera gets dirty. The oven can use automated methods to detect the dirty-camera condition and effectively notify a user to clean the camera.

In second illustrative example of the method, the oven captures an image when a user closes the oven door, which on average allows the system to capture at least one image of food and one image of an empty cavity. The image is then fed into a neural network. In a specific embodiment, the neural network is a 3-class neural network that given an image is trained to detect [food, empty-cavity-clean-camera, empty-cavity-dirty-camera]. Alternatively, this functionality could be part of a bigger neural network that detects multiple foods [$food_1$, ..., $food_N$, empty-cavity-clean-camera, empty-cavity-dirty-camera]. An optional additional hysteresis in software can be applied when the oven is classified as empty-cavity-dirty-camera. In this embodiment, the method can include: across multiple cooking sessions, the oven software stores a history of last N verdicts of the neural network. It outputs 'dirty-camera' if M out last N verdicts are 'empty-cavity-dirty-camera' and the most recent verdict is 'empty-cavity-dirty-camera'. The user can then be notified when the software outputs "dirty camera." In a specific example, the system presents a "Clean the Camera" message on the oven or via email notification at appropriate time/times (e.g., oven is cool, user likely to clean, etc.). The notification parameters can optionally be selected or tailored (e.g., for the user). For example, the frequency of notification can depend on the length of time that the camera has been considered dirty (e.g., debouncing or exponential backoff for nags). However, other notifications, such as a dirtiness badge, can be presented (e.g., on the oven display, on a user device, etc.).

Different processes and/or elements discussed above can be performed and controlled by the same or different entities. In the latter variants, different subsystems can communicate via: APIs (e.g., using API requests and responses, API keys, etc.), requests, and/or other communication channels.

An alternative embodiment implements the above methods in a computer-readable medium storing computer-readable instructions. The instructions are preferably executed by computer-executable components integrated with the system. The computer-readable medium may be stored on any suitable computer-readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device. The computing systems disclosed above can include one or more physical processors (e.g., CPU, GPU, microprocessors, ASICs, etc.) and/or other computer-executable component or hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system for dirty camera detection, comprising:
an appliance, comprising a camera and a cook cavity; and
a processor, configured to:
    detect a first state change event at the appliance;
    after detection of the first state change event, sample a set of cavity measurements;
    determine a class label for the cook cavity using the set of cavity measurements, wherein the class label represents multi-component state combinations for the cook cavity and the camera; and
    facilitate use of the appliance based on the class label.

2. The system of claim 1, wherein the appliance is an oven.

3. The system of claim 1, wherein the processor is further configured to:
store preceding class labels;
retrieve the preceding class labels in response to the class label indicative of a dirty camera state; and
verify that the camera is dirty when at least a predetermined number of dirty camera state classifications appear within the preceding class labels.

4. The system of claim 3, wherein the preceding class labels that are retrieved comprise class labels from a predetermined time period prior to a current time.

5. The system of claim 3, wherein the predetermined number of dirty camera state classifications are for images that depict empty cook cavities.

6. The system of claim 1, wherein the class label is determined using a neural network, wherein the neural network is trained using a plurality of images that depict an empty cook cavity.

7. The system of claim 6, wherein the neural network is trained using images from a plurality of different appliances.

* * * * *